United States Patent [19]

Riddle

[11] Patent Number: 5,018,185
[45] Date of Patent: May 21, 1991

[54] TAMPERPROOF PAY TELEPHONE
[76] Inventor: Robert Riddle, 526 Rutland St., Westbury, N.Y. 11590
[21] Appl. No.: 496,653
[22] Filed: Mar. 21, 1990
[51] Int. Cl.$^5$ .................... H04M 1/15; H04M 17/00
[52] U.S. Cl. ................................... 379/145; 379/438
[58] Field of Search .................. 379/145, 438, 451

[56] References Cited
U.S. PATENT DOCUMENTS
4,845,774  7/1989  Arzounian ........................ 379/438

Primary Examiner—Stafford D. Schreyer
Attorney, Agent, or Firm—Michael I. Kroll

[57] ABSTRACT

A tamperproof pay telephone is disclosed. The tamperproof pay telephone includes a main portion having an upper coin housing portion with an upper coin housing wall, a handset, a cord connecting the handset to the upper coin housing wall of the upper coin housing portion of the main portion, and an attachment assembly for securing the cord to the upper coin housing wall, the cord including an inner tube liner, four telephone wires of which one is a power wire, the four telephone wires passing through the inner tube liner, the inner tube of stainless steel wire braided rope which is ultimately encased in a stainless steel armored hose so that the inner tube of stainless steel wire braided rope adds flexibility while adding protection by rolling when a cut to the cord is attempted, the inner tube of the stainless steel wire braided rope prevents the cutting open of the stainless steel armored hose in order to prevent access to the wires, as well as, preventing the twisting of the handset that would cause the stainless steel armored hose to unwind.

13 Claims, 2 Drawing Sheets

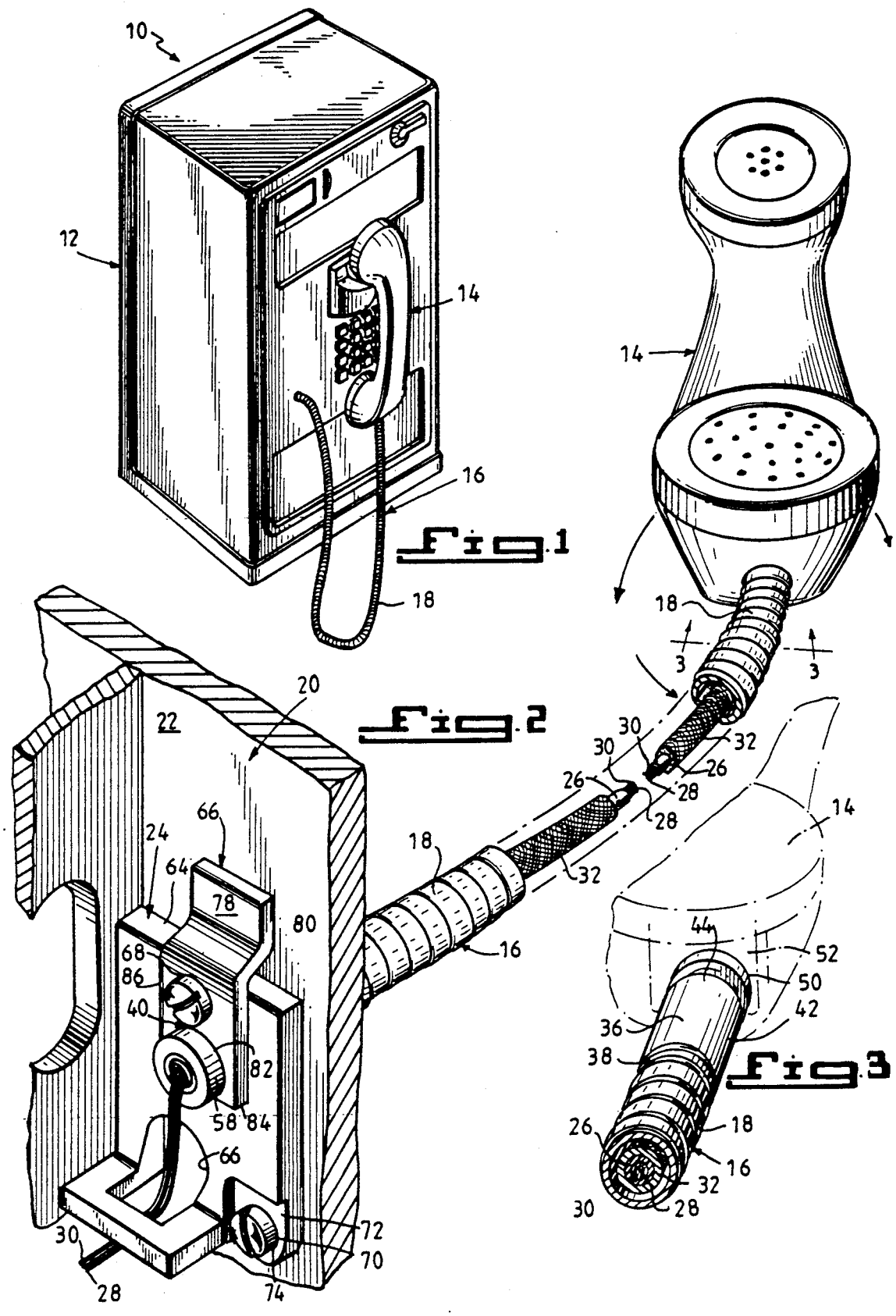

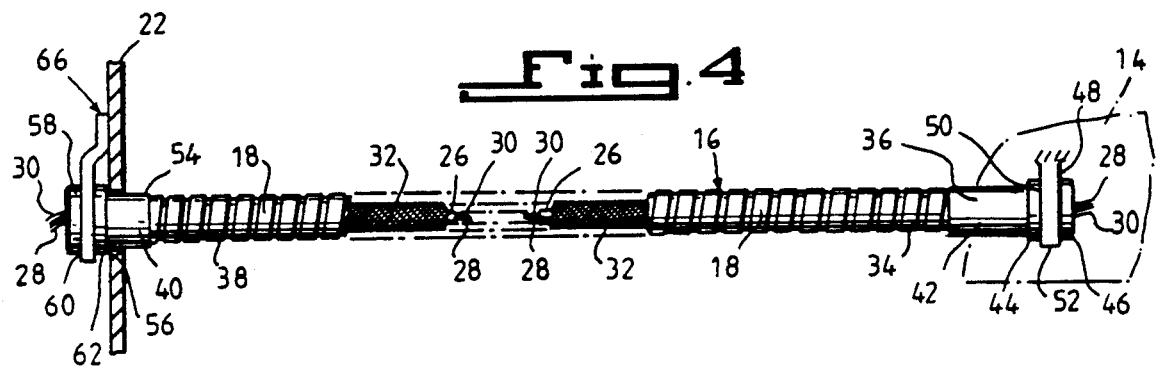
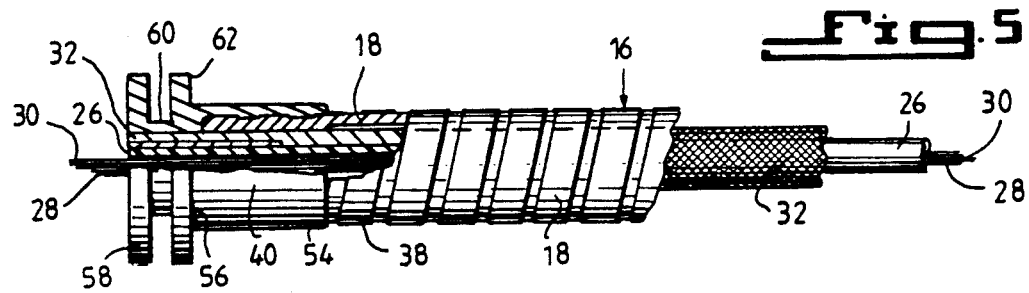
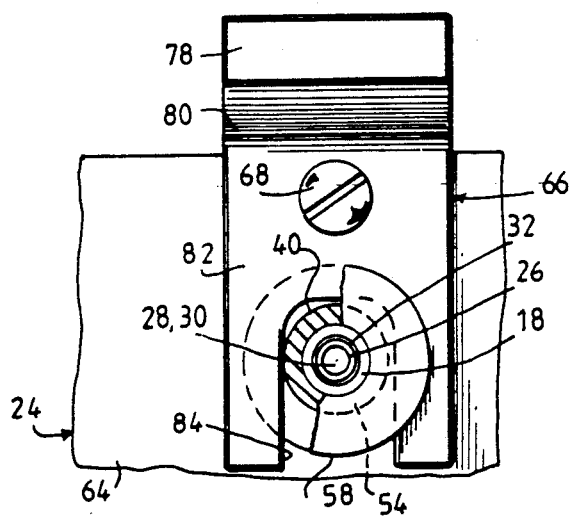

TAMPERPROOF PAY TELEPHONE

BACKGROUND OF THE INVENTION

1. Field of the Invention

The present invention relates to a pay telephone. More particularly, the present invention relates to a tamper-roof pay telephone.

2. Description of the Prior Art

A serious problem facing the Telecommunication industry has surfaced. It centers around the armored hose which connects the handset to the upper coin housing on all pay telephones. The existing armored hose is being repeatedly vandalized and it has reached epidemic proportions.

Vandals are compromising the stainless steel armored hose in several ways. One method of achieving this is by taking the handset, twisting it, and unraveling the armored hose. The vandal then shorts out the exposed red wire which in turn locks up the coin return relay. Still another way of vandalism is by cutting the outside hose with 6". cutting pliers and subsequently shorting out the red wire. The most prevalent method is the first one. Most importantly, once the unit is shorted out and a user puts money into the pay telephone, the user does not receive a dial tone, and the money does not return.

The pay telephone is capable of holding in its coin shoot about twelve dollars. When the vandal returns and takes out the short, the pay telephone becomes operable and releases the money to the coin return. As is obvious, a vandal with a few telephones can make a living doing this. The telephone companies are losing millions of dollars a year in potential revenue, while the consumer is being defrauded.

Numerous innovations for drafting devices have been provided in the prior art that are adapted to be used. Even though these innovations may be suitable for the specific individual purposes to which they address, they would not be suitable for the purposes of the present invention as heretofore described.

SUMMARY OF THE INVENTION

Accordingly, it is an object of the present invention to provide a tamperproof pay telephone that avoids the disadvantages of the prior art.

More particularly, it is an object of the present invention to provide a tamperproof pay telephone that permits the handset and the armored hose to rotate freely and eliminate the theft problem. It involves stainless steel hose, through which the wires run, with a set of special fittings to fit any/all pay telephones. The stainless steel hose is considerably harder than the one used on the existing prior art hose. The end fittings of the present invention are swagged on permanently.

The swag end fittings are the same on both ends of the chord. However, on the handset end of the cord, a metal flange is added to the end fitting. Additionally, an inner tube of stainless steel rope lined with a plastic tube is provided. This rope prevents the cutting open of the hose to gain access to the wires, as well as, twisting the handset to cause the hose to unwind.

In keeping with these objects, and with others which will become apparent hereinafter, one feature of the present invention resides, briefly stated, in a tamperproof pay telephone, comprising, a main portion having an upper coin housing portion with an upper coin housing wall, a handset, a cord connecting the handset to the upper coin housing wall of the upper coin housing portion of the main portion, and an attachment assembly for securing the cord to the upper coin housing wall, the cord including an inner tube liner, four telephone wires of which one is a power wire, the four telephone wires passing through the inner tube liner, the inner tube of stainless steel wire braided rope which is ultimately encased in a stainless steel armored hose.

When the tamperproof pay telephone is designed in accordance with the present invention, the inner tube of stainless steel wire braided rope adds flexibility while adding protection by rolling when a cut to the cord is attempted, the inner tube of the stainless steel wire braided rope prevents the cutting open of the stainless steel armored hose in order to prevent access to the wires, as well as, preventing the twisting of the handset that would cause the stainless steel armored hose to unwind.

In accordance with another feature of the present invention, the cord has a handset end and an upper coin housing wall end, the handset end having a handset fitting permanently swagged thereon and the upper coin housing wall end having an upper coin housing wall fitting permanently swagged thereon.

Another feature of the present invention is that the handset fitting includes a substantially cylindrical body portion having a free end onto which an outer circular flange is disposed and an inner circular flange is displaced a distance inward from the outer circular flange.

Yet another feature of the present invention is that it further comprises a "U"-shaped connector disposed within the handset and holding the handset end of the cord in place.

Still another feature of the present invention is that the upper coin housing wall fitting includes a substantially cylindrical body portion having a free end onto which an outer circular flange is disposed and an inner circular flange is displaced a distance inward from the outer circular flange Yet still another feature of the present invention is that it further comprises an attachment assembly affixed to the upper coin housing wall of the upper coin housing portion and holding the upper coin housing wall end of the cord in place.

Still yet another feature of the present invention is that the attachment assembly includes a plate, a removable offset "U"-clamp, an affixing screw, and a mounting screw.

Another feature of the present invention is that the plate contains a lower recess which contains a throughbore through which the mounting screw passes and mounts the plate to the upper coin housing wall, the plate further containing a wire passageway through which the wires pass.

Yet another feature of the present invention is that the removable offset "U"-clamp includes a tail portion, an offset portion, and a "U"-channel portion, the "U"-channel portion containing a "U"shaped cutout and a throughbore through which the affixing screw passes and affixes the "U"-clamp to the plate.

Still another feature of the present invention is that the "U"-shaped cutout of the "U"-channel portion is disposed within the upper coin housing portion and holding the upper coin housing wall end of the cord in place.

Yet still another feature of the present invention is that the inner tube liner is brass.

Still yet another feature of the present invention is that the inner tube liner is plastic.

Another feature of the present invention is that the "U"-shaped connector is metallic.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

FIG. 1 is a perspective view of a pay telephone;

FIG. 2 is a perspective view of the inventive cord, in partial break away, connecting the handset to the upper coin housing of the pay telephone;

FIG. 3 is a perspective view of the end fitting used to connect the inventive cord to the handset, which is shown in phantom;

FIG. 4 is a side view of the inventive cord, in partial breakaway, connecting the wall of the upper coin housing of the pay telephone to the handset, which is shown in phantom;

FIG. 5 is a side view of the end fitting used to connect the inventive cord, in partial break away, to the wall of the upper coin housing of the pay telephone; and FIG. 6 is a front view of the assembly, in partial break away, used to connect the end fitting to the wall of the upper coin housing of the pay telephone.

LIST OF REFERENCE NUMERALS UTILIZED IN THE DRAWING

10 - tamperproof pay telephone of the present invention
12 - main portion
14 - handset
16 - improved cord
18 - stainless steel armored hose
20 - upper coin housing portion
22 - upper coin housing wall
24 - attachment assembly
26 - inner tube liner
28 - four telephone wires
30 - power wire
32 - stainless steel wire braided rope
34 - handset end
36 - handset fitting
38 - upper coin housing wall end
40 - upper coin housing wall fitting
42 - cylindrical body portion
44 - free end
46 - outer circular flange
48 - distance
50 - inner circular flange
52 - "U"-shaped connector
54 - substantially cylindrical body portion
56 - free end
58 - outer circular flange
60 - distance
62 - inner circular flange
64 - plate
66 - "U"-clamp
68 - affixing screw
70 - mounting screw
72 - lower recess
74 - throughbore
76 - passageway
78 - tail portion
80 - offset portion
82 - "U"-channel portion
84 - "U"-shaped cutout
86 - throughbore

DETAILED DESCRIPTION OF THE PREFERRED EMBODIMENT

Referring now to FIG. 1, the tamperproof pay telephone of the present invention is shown generally as 10 and includes a main portion 12, a handset 14, and an improved cord 16. The cord 16 connects the handset 14 to the main portion 12 of the tamperproof pay telephone 10. The improved cord 16 is encased in a stainless steel armored hose 18.

The improved cord 16, as shown in FIG. 2, enters the main portion 12 of the tamperproof pay telephone 10, at the upper coin housing portion 20. The upper coin housing portion 20 is defined by the upper coin housing wall 22, on to which, through an attachment assembly 24, the improved cord 16 is attached.

The improved cord 16, as shown in FIGS. 2 through 5, includes an inner tube liner 26, which can be either brass or plastic, but is not limited to it. The four telephone wires 28, including the power wire 30, pass through the inner tube liner 26. The inner tube liner 26 is surrounded by an inner tube of stainless steel wire braided rope 32, which is ultimately encased in the stainless steel armored hose 18. The inner tube of stainless steel wire braided rope 32 adds flexibility while adding protection by rolling when a cut to the cord 16 is attempted. The inner tube of the stainless steel wire braided rope 32 prevents the cutting open of the stainless steel armored hose 18 in order to prevent access to the wires 28, as well as, preventing the twisting of the handset 14 that would cause the stainless steel armored hose 18 to unwind.

On the handset end 34 of the improved cord 16 is permanently swagged a handset fitting 36. On the upper coin housing wall end 38 of the improved cord 16 is permanently swagged an upper coin housing wall fitting 40.

The handset fitting 36 consists of a substantially cylindrical body portion 42 having a free end 44 onto which an outer circular flange 46 is disposed. Displaced distance 48 inward from the outer circular flange 46 is disposed an inner circular flange 50. A metal "U"-shaped connector 52 is disposed within the handset 14 and holds the handset end 34 of the improved cord 16 in place. This is achieved by having the distance 48 and the inner circular flange 50 straddle the metal "U"-shaped connector 52 as it fits on the shaft defined by the distance 48.

The upper coin housing wall fitting 40 consists of a substantially cylindrical body portion 54 having a free end 56 onto which an outer circular flange 58 is disposed. Displaced a distance 60 inward from the outer circular flange 58 is disposed an inner circular flange 62.

The attachment assembly 24 is affixed to the upper coin housing wall 22 of the upper coin housing portion 20 and holds the upper coin housing wall end 38 of the improved cord 16 in place.

The details of the attachment assembly 24, can be best seen in FIGS. 2 and 6. The attachment assembly 24 consists of a plate 64, a removable offset "U"-clamp 66, an affixing screw 68, and a mounting screw 70. The plate 64 contains a lower recess 72 containing a throughbore 74 through which the screw 70 passes and mounts the plate 64 to the upper coin housing wall 22. Furthermore, the plate 64 contains a wire passageway 76 through which the wires 28 pass.

The removable offset "U"-clamp 66 includes a tail portion 78, an offset portion 80, and a "U"channel portion 82. The "U"-channel portion 82 contains a "U"-shaped cutout 84 and a throughbore 86 through which the affixing screw 68 passes and affixes the "U"-clamp 66 to the plate 64. The "U"shaped cutout 84 of the "U"-channel portion 82 is disposed within the upper coin housing portion 20 and holds the upper coin housing wall end 38 of the improved cord 16 in place. This is achieved by having the outer circular flange 58 and the inner circular flange 62 straddle the "U"-shaped cutout 84 of the "U"-channel portion 82 as it fits on the shaft defined by the distance 60.

It will be understood that each of the elements described above, or two or more together, may also find a useful application in other types of constructions differing from the type described above.

While the invention has been illustrated and described as embodied in a tamperproof pay telephone, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A tamperproof pay telephone comprising:
   (a) a main portion having an upper coin housing portion with an upper coin housing wall;
   (b) a handset;
   (c) a cord connecting said handset to said upper coin housing wall of said upper coin housing portion of said main portion; and
   (d) an attachment assembly for securing said cord to said upper coin housing wall, said cord including an inner tube liner, an inner tube of a stainless steel wire braided rope, four telephone wires of which one is a power wire, said four telephone wires passing through said inner tube liner, said inner tube of said stainless steel wire braided rope which is ultimately encased in a stainless steel armored hose so that said inner tube of said stainless steel wire braided rope adds flexibility while adding protection by rolling when a cut to said cord is attempted, said inner tube of said stainless steel wire braided rope prevents the cutting open of said stainless steel armored hose in order to prevent access to said four telephone wires, as well as, preventing the twisting of said handset that would cause said stainless steel armored hose to unwind.

2. A telephone as defined in claim 1, wherein said cord has a handset end and an upper coin housing wall end, said handset end having a handset fitting permanently swagged thereon and said upper coin housing wall end having an upper coin housing wall fitting permanently swagged thereon.

3. A telephone as defined in claim 2, wherein said handset fitting includes a substantially cylindrical body portion having a free end onto which an outer circular flange is disposed and an inner circular flange is displaced a distance inward from said outer circular flange.

4. A telephone as defined in claim 3; further comprising a "U"-shaped connector disposed within said handset and holding said handset end of said cord in place.

5. A telephone as defined in claim 4, wherein said upper coin housing wall fitting includes a substantially cylindrical body portion having a free end onto which an outer circular flange is disposed and an inner circular flange is displaced a distance inward from said outer circular flange.

6. A telephone as defined in claim 5; further comprising an attachment assembly affixed to said upper coin housing wall of said upper coin housing portion and holding said upper coin housing wall end of said cord in place.

7. A telephone as defined in claim 6, wherein said attachment assembly includes a plate, a removable offset "U"-clamp, an affixing screw, and a mounting screw.

8. A telephone as defined in claim 7, wherein said plate contains a lower recess which contains a throughbore through which said mounting screw passes and mounts said plate to said upper coin housing wall, said plate further containing a wire passageway through which said wires pass.

9. A telephone as defined in claim 8, wherein said removable offset "U"-clamp includes a tail portion, an offset portion, and a "U"-channel portion, said "U"-channel portion containing a "U"-shaped cutout and a throughbore through which said affixing screw passes and affixes said "U"-clamp to said plate.

10. A telephone as defined in claim 9, wherein said "U"-shaped cutout of said "U"-channel portion is disposed within said upper coin housing portion and holding said upper coin housing wall end of said cord in place.

11. A telephone as defined in claim 1, wherein said inner tube liner is brass.

12. A telephone as defined in claim 1, wherein said inner tube liner is plastic.

13. A telephone as defined in claim 4, wherein said "U"-shaped connector is metallic.

* * * * *